INDUSTRIAL OIL FILTER CONTROL UNIT

Original Filed July 21, 1958 2 Sheets-Sheet 1

INVENTOR.
NILS O. ROSAEN
BY
ATTORNEYS

INDUSTRIAL OIL FILTER CONTROL UNIT

Original Filed July 21, 1958 2 Sheets-Sheet 2

INVENTOR.
NILS O. ROSAEN
BY Hanke & Hordesty
ATTORNEYS

United States Patent Office

Re. 26,752
Reissued Jan. 6, 1970

26,752

INDUSTRIAL OIL FILTER CONTROL UNIT

Nils O. Rosaen, Hazel Park, Mich., assignor to The Rosaen Filter Company, Hazel Park, Mich., a corporation of Michigan Original No. 2,936,731, dated May 17, 1960, Ser. No. 749,952, July 21, 1958. Application for reissue Sept. 21, 1966, Ser. No. 601,244

Int. Cl. G01f *15/00*

U.S. Cl. 116—70 7 Claims

Matter enclosed in heavy brackets [ ] appears in the original patent but forms no part of this reissue specification; matter printed in italics indicates the additions made by reissue.

*ABSTRACT OF THE DISCLOSURE*

*A liquid filter control unit for maintaining continuous circulation of liquid under pressure. The unit being in communication with means to filter the liquid and having means operable under pressure to by-pass liquid when the filtering means is no longer effectively filtering. The unit having indicator means to indicate liquid routing.*

The present invention relates to an industrial oil filter and more specifically to a filter provided with means to provide information as to filter condition.

In many machine installations, means is provided for circulating oil in considerable volume over parts of the machine, work being done or for other reasons, and in order to insure a supply of substantially clean oil, filtration is imperative.

However, the filters used for this purpose eventually become clogged so that the oil will not pass or will pass too slowly to be practicable.

Among the objects of the present invention is to provide means which will indicate to an observer the condition of the filter; that is, whether it is clean, partially clogged but still operating, or too clogged to pass the fluid.

Other objects will readily occur to those skilled in the art upon reference to the following description and the accompanying drawings in which FIGURE 1 is a side elevational view, indicating a submerged suction filter.

Figure 2:
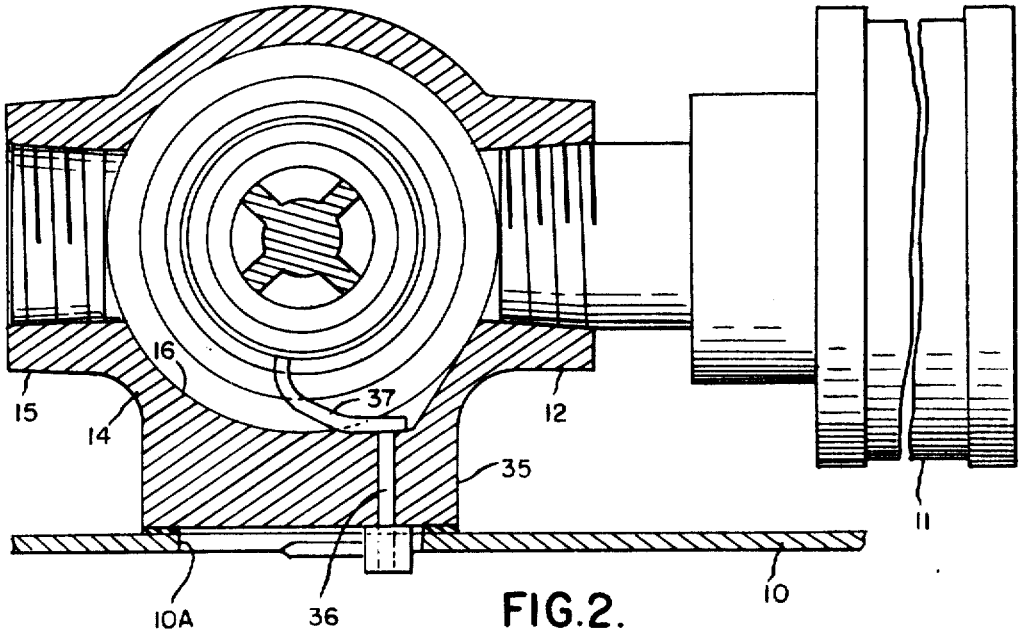
FIGURE 2 is a central horizontal sectional view of the structure of FIGURE 1.

As indicated in the drawings, the invention relates primarily to a filter which is normally submerged in a tank holding a body of oil from which it is pumped to the point of use and to which it is then returned. Such a tank is indicated by the wall 10. The filter itself is indicated at 11 and will consist usually of a screen formed into a cylinder with a closure for one end and the other end opening to the fitting shown in detail.

The fitting as shown comprises a body 14 having an inlet 12 to which the filter 11 is fixed and into which oil flows from the filter. The body 14 also is shown as having two outlets 15 either or both of which may be used, a suction pump being connected thereto.

Figure 3:
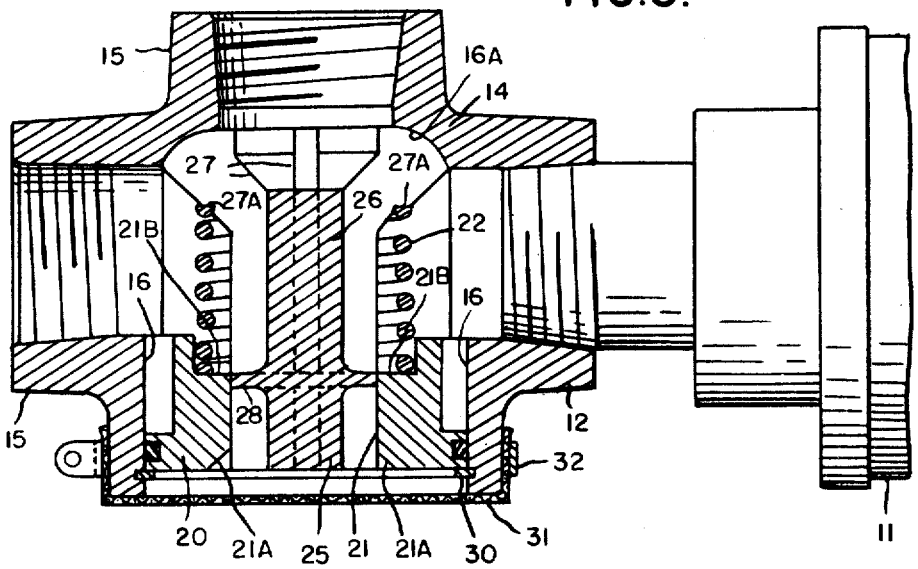
FIGURE 3 is a central sectional view on a vertical plane, of the structure of FIGURE 1.
Figure 4:
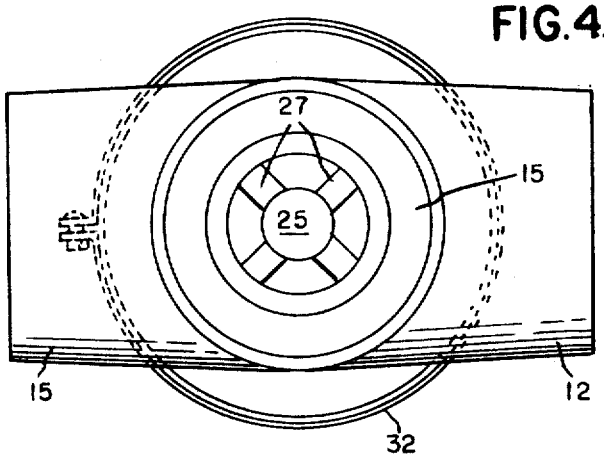
FIGURE 4 is a top plan view of a portion of the control unit.

As shown best in FIG. 3, the body 14 is provided with a large central bore 16 open to the bottom of the fitting and terminating near the top in a dome shaped portion 16A somewhat smaller in diameter. The bore 16 is open to the inlet 12 and the outlets 15 either of which may be utilized, the other being plugged. In the lower portion of bore 16 is fitted a piston 20 this being in the form of a ring having a relatively large central opening 21. The piston 20 is also shown as reduced in diameter in its upper portion above the gasketed portion fitting the bore.

The central opening 21 is also shown as flared at the bottom as at 21A and provided at its upper end with a shoulder or recess 21B serving as a seat for a spring 22.

Also in the bore 16 is a valve member and piston guide 25. This consists of a [bore] *core* 26, preferably cylindrical, of much smaller diameter than the central opening 21 in piston 20, which core is provided with longitudinal ribs 27, four being shown, and with a disc 28 having substantially the same diameter as that of the opening 21. However, it should be enough smaller to provide for a sliding fit. Disc 28 is located within the upper end of the opening 21 when the piston 20 is at its lowest position.

The outer edges of ribs 27 are machined parallel and to fit the opening 21 for the greater portion of their length, but at their upper portions incline outwardly and the core cut away so that free oil flow to the upper outlet 15 is permitted. The upper ends of the ribs 27 are formed to abut the dome shaped portion 16A of the bore 16. The inclined portions of the ribs 27 are also notched as at 27A to provide a seat for the upper end of spring 22.

The piston 20, [member] *piston guide* 25 and spring 22 are inserted as a unit into the bore 16 and retained therein by means of a snap ring 30 seated in a suitable groove near the bottom or open end of the bore, while the said open end is covered by a screen 31 held in place by a suitable ring 32.

Figure 1:
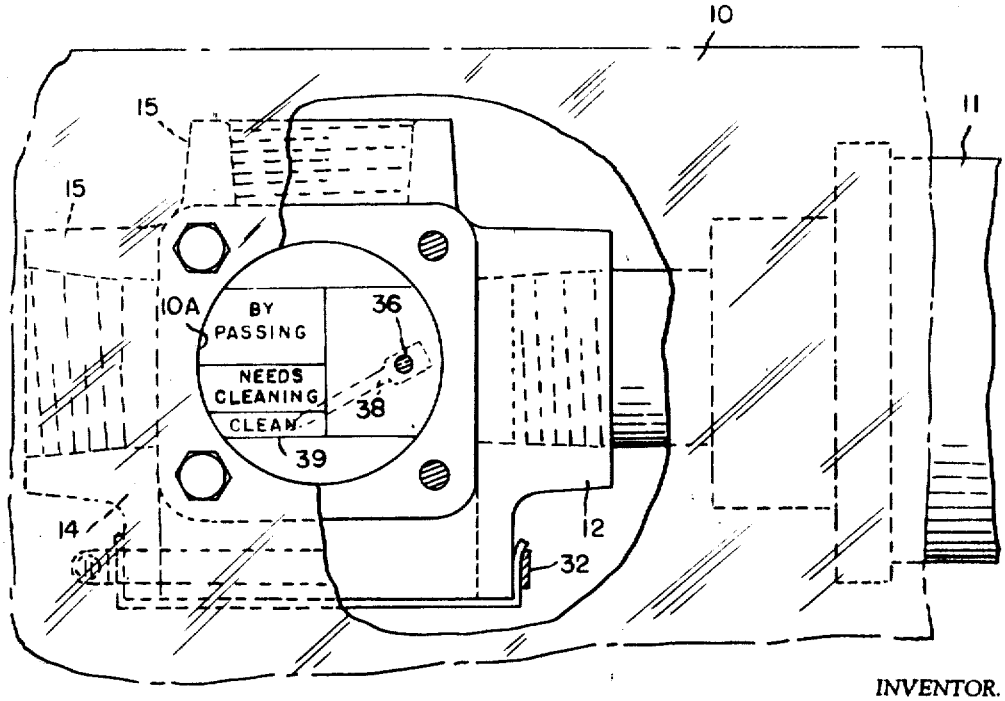

In FIGS. 1 and 2 is shown the *indicator* [tell-tale] which serves to indicate the condition of the filter [screen] 11. At one side of the body 14, a large boss 35 is provided extending outward to a location well beyond the [screen element] *filter* 11 so that the outer end may be placed against the tank wall 10, which at this location is provided with a suitable window 10A.

Rotatably mounted in the boss 35 and extending into the bore 16 is a shaft 36 having fixed to its inner end an arm 37 having its end contacting the piston 20 so that movement of the latter will rotate the shaft 36. On the outer end of shaft 36 is fixed an arm or pointer 38, cooperating with a suitable legend 39 to indicate from the position of the pointer with respect thereto, and thereby the position of the piston, whether the filter is clean, needs cleaning, or is bypassing oil.

In the operation of the device, the unit together with the filter will be submerged in the tank of oil. Either or both outlets 15 will be connected to a suitable circulating suction pump. If one outlet 15 is to be used, the other will of course be plugged.

As the filter 11 becomes clogged, the reduced pressure in the filter and indicating member will cause the piston 20 to rise against the spring pressure and thereby move the indicator hand 38. When the piston 20 has risen sufficiently far to bring the flare or bevel 21A above the disc 28, oil will of course enter through screen 31 and thus bypass the filter 11. The indicator 38 will then be at its uppermost position to indicate such bypassing.

Figure 5:
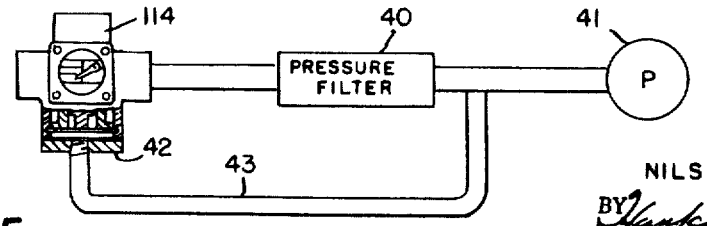
FIGURE 5 is a more or less diagrammatic view showing the adaptation to a pressure filter.

In FIGURE 5 the use of the fitting for control of a pressure filter is shown. In this figure, a pressure filter is indicated at 40, oil being circulated therethrough by a suitable pump 41. From the filter the oil passes to the fitting 114 and thence to the place of use (not shown).

The fitting 114 may be identical with that shown in FIGS. 1 to 4 with the execption that the screen 31 is replaced by a cap 42, opening through which is a conduit 43 leading from the fluid line ahead of the filter; that is, between the pump 41 and the filter 40. In this installation, the filter and fitting may or may not be submerged in the oil tank.

In the arrangement of FIG. 5, the operation of the device is the same as above and the piston is actuated by the difference in pressure above and below it. In the above description the pressure below the piston will be atmospheric (open tank) or whatever pressure there may be in a closed tank.

In the operation of the arrangement of FIGURE 5, the pressure below the piston will be that developed by the pump to force the oil through the filter. The condition of the filter in either case will regulate the position of the piston and the position of the piston will be indicated by the pointer 38 and scale 39.

I claim:

[1. In combination with a submerged oil filter, a fitting, said fitting consisting of a body provided with an inlet for attachment to the outlet of the filter and with an oil oulet, means for circulating oil through the filter and said body, said body being provided with a bore opening to the bottom of said body, and having an annular piston slidably fitting said bore, a valve member fitted into the central opening in said piston, said valve member consisting of a core having a valve disc fitting into and normally located in and closing said opening, said core being also provided with a plurality of ribs extending above said disc, spring means normally maintaining said piston in a position in which said disc blocks said opening but yielding to allow said piston to move to a position wherein said opening is unblocked, and means actuated by said piston and visible outside of said body indicating the actual position of said piston.]

[2. In combination with a submerged oil filter, a fitting, said fitting consisting of a body provided with an inlet for attachment to the outlet of the filter and with an oil outlet, means for circulating oil through the filter and said body, said body being provided with a bore opening to the bottom of said body, a piston in said bore and having one face exposed to the submerging oil, said piston being actuable by the pressure difference within and without said body, a shoulder on said piston, a lever having its free end resting on said shoulder and fixed to a shaft extending through and having a bearing in a wall of said body and an indicator hand fixed to the outer end of said shaft to indicate the position of said lever and thereby of said piston.]

[3. In combination with a submerged oil filter, a fitting having an inlet connected to the outlet of said filter, and an outlet for connection with oil circulating means, a chamber in said fitting open to said inlet and outlet and to the outside of the fitting, a piston slidably mounted in said chamber and exposed to the submerging oil, valve means operatively associated with said piston whereby said valve means is opened and closed by movement of said piston, and means indicating the position of said piston, said indicating means being actuated by said piston.]

[4. The combination of an oil filter and a fitting, said fitting comprising a body having a chamber, means for conducting oil from the oil filter to said chamber, and means for conducting oil from said chamber to the point of use, said chamber being provided with a movable wall, subjected on one side to pressure conditions in said chamber, means for subjecting the other side of said wall to pressure conditions existing in the oil entering said filter, and means actuated by and indicating the position of said wall resulting from a difference in said pressure conditions.]

[5. The combination of an oil filter and a fitting, said fitting comprising a body having a chamber, means for conducting oil from the oil filter to said chamber, and means for conducting oil from said chamber to the point of use, a piston constituting at least a portion of one wall of said chamber and subjected on one face to pressure conditions in said chamber, means for subjecting the other face of said piston to pressure conditions existing in the oil entering said filter, and means actuated by and indicating the position of said wall resulting from a difference in said pressure conditions.]

*6. A fitting in combination with a liquid filter formed with means open to a source of liquid and formed with an outlet port, including means for normally circulating liquid from said source through the filter to the outlet port and therefrom through the fiting to a liquid user, said fitting comprising:*

*(a) a body structure formed with a bore having one end adapted to communicate with said source of liquid, an inlet and an outlet formed in said body and connected with an interior portion of said bore, said inlet connected with the filter outlet port and said outlet connected with said liquid user,*

*(b) a piston slideable in said bore and movable in response to changes in differential between liquid pressure of the source and in the interior portion of said bore as said filter becomes progressively clogged with foreign matter, and valve means supported by said body structure within said bore, said piston and said valve means cooperating to close communication between the interior portion of said bore and said source of liquid during a predetermined movement of said piston as the filter becomes progressively clogged and to open communication at the limit of said predetermined movement to by-pass liquid from the source through said bore to the outlet of said fitting,*

*(c) spring means within said bore urging said piston toward a position in which communication between the interior portion of the bore and said source of liquid is closed,*

*(d) an arm element rotatably carried by said body structure within said bore and operatively engaged with said piston to be rotated by movement thereof, an indicator element rotatably carried by and exteriorly of said body structure and operatively connected with said arm element to be rotated thereby as said piston moves to indicate on an arcuate scale mounted on the exterior of said body structure the progressively clogged condition of said filter as reflected by piston movement.*

*7. The combination as defined in claim 6 wherein said filter is submerged in the liquid of the source and said circulating means comprises means generating suction at the outlet of said fitting to draw liquid normally through said filter and on by-passing to draw liquid from the source directly into said bore and out said fitting outlet.*

*8. The combination as defined in claim 6 wherein said circulating means comprises means to direct liquid under pressure from the source normally through said filter and on by-passing to direct liquid under pressure from the source directly into said bore and out said fitting outlet.*

*9. The combination as defined in claim 6 wherein said arm and indicator elements are secured to opposite ends of a shaft rotatably bearingly carried by said body and extending through a side wall thereof into the interior portion of said bore for rotation on the shaft axis by movement of said piston rotating said arm element.*

*10. The combination as defined in claim 6 wherein said piston has a passageway extending axially therethrough and said valve means comprises a core member extending into said passageway and having a valve disk relatively slideably fitting therein, and means immovably supporting said core member by said body structure.*

*11. The combination as defined in claim 10 wherein said passageway is aligned concentric with said bore, and said core is concentrically positioned within said bore and within said passageway, said means supporting said core comprising longitudinal ribs extending radially from said core to slideably fit said passageway and are formed at the end of said core disposed in the interior portion*

*of said bore to abut the body structure for support of said core.*

*12. The combination as defined in claim 11 wherein said spring means comprises a coil spring surrounding said core and portions of said ribs, said spring extending between and abutting the piston and a portion of said ribs disposed in the interior portion of said bore.*

References Cited

The following references cited by the Examiner, are of record in the patented file of this patent or the original patent.

UNITED STATES PATENTS

| | | |
|---|---|---|
| 2,669,707 | 2/1954 | Ehrman. |
| 2,843,077 | 7/1958 | Leefer. |

| | | | |
|---|---|---|---|
| 2,217,056 | 10/1940 | Johnson | 137—526 |
| 2,308,583 | 1/1943 | Berges | 137—526 |
| 2,400,200 | 5/1946 | Katcher | 210—411 XR |
| 2,499,494 | 3/1950 | Greer | 210—62 |
| 2,523,967 | 9/1950 | Nystul | 200—83 |
| 2,567,430 | 9/1951 | Griffiths | 116—124 |
| 2,678,134 | 5/1954 | Middleton | 210—131 |
| 2,700,362 | 1/1955 | Calling | 116—117 |
| 2,776,056 | 1/1957 | Douglas | 210—166 |
| 3,077,267 | 2/1963 | Rosaen | 210—90 |

LOUIS J. CAPOZI, Primary Examiner

U.S. Cl. X.R.

210—90